United States Patent
Staedele et al.

(10) Patent No.: US 10,661,800 B2
(45) Date of Patent: May 26, 2020

(54) AGRICULTURAL VEHICLE DRIVELINE

(71) Applicant: AGCO International GmbH, Neuhausen (CH)

(72) Inventors: Alexander Staedele, Landsberg am Lech (DE); Markus Geiger, Marktoberdorf (DE)

(73) Assignee: AGCO International GmbH, Neuhausen (CH)

( * ) Notice: Subject to any disclaimer, the term of this patent is extended or adjusted under 35 U.S.C. 154(b) by 11 days.

(21) Appl. No.: 15/767,961

(22) PCT Filed: Sep. 27, 2016

(86) PCT No.: PCT/EP2016/072909
§ 371 (c)(1),
(2) Date: Apr. 12, 2018

(87) PCT Pub. No.: WO2017/063864
PCT Pub. Date: Apr. 20, 2017

(65) Prior Publication Data
US 2018/0290653 A1  Oct. 11, 2018

(30) Foreign Application Priority Data
Oct. 14, 2015 (GB) .................................. 1518189.4

(51) Int. Cl.
*B60W 10/103* (2012.01)
*F16H 61/439* (2010.01)
(Continued)

(52) U.S. Cl.
CPC ..... *B60W 30/18072* (2013.01); *B60K 17/356* (2013.01); *B60K 23/0808* (2013.01);
(Continued)

(58) Field of Classification Search
CPC ..... B60W 10/103; F16H 61/439; F16H 61/44
See application file for complete search history.

(56) References Cited

U.S. PATENT DOCUMENTS 7,712,565 B2 * 5/2010 Udagawa ............... B60K 17/10
180/242
2001/0025736 A1  10/2001 Komatsu
(Continued)

FOREIGN PATENT DOCUMENTS

EP   2 199 134 A1   6/2010
EP   2984914 A1     2/2016
(Continued)

OTHER PUBLICATIONS

UK Intellectual Property Office, Internaational Search Report for Priority Application No. GB1518189.4, dated Apr. 18, 2016.
European Patent Office, International Search Report for Application No. PCT/EP2016/072909, dated Dec. 19, 2016.

*Primary Examiner* — Tisha D Lewis

(57) ABSTRACT

A drivetrain for an agricultural vehicle and method for controlling the same. The drivetrain includes first and second driven axles with a variable pivot angle hydraulic motor connectable to drive the first axle through engagement of a first clutch mechanism. A further motor is connected to drive the second axle. In operation, the pivot angle of the variable pivot angle hydraulic motor is reduced with variation in a vehicle parameter value, such as transmission ratio or ground speed, to a point at which the pivot angle reaches zero at a first parameter value. With the pivot angle at zero and parameter value continuing to vary due to the drive of the further motor, the first clutch mechanism is disengaged at a second parameter value, with the first and second parameter values separated by an interval determined at least partly by an operating characteristic of the first clutch mechanism.

13 Claims, 3 Drawing Sheets

(51) Int. Cl.
*F16H 61/44* (2006.01)
*B60W 30/18* (2012.01)
*F16H 61/421* (2010.01)
*F16H 47/04* (2006.01)
*F16H 61/444* (2010.01)
*B60K 17/356* (2006.01)
*B60K 23/08* (2006.01)
*B60W 10/02* (2006.01)

(52) U.S. Cl.
CPC .......... *B60W 10/02* (2013.01); *B60W 10/103* (2013.01); *F16H 47/04* (2013.01); *F16H 61/421* (2013.01); *F16H 61/439* (2013.01); *F16H 61/44* (2013.01); *F16H 61/444* (2013.01); *B60W 2300/152* (2013.01); *B60W 2510/1005* (2013.01); *B60W 2520/10* (2013.01); *B60W 2710/021* (2013.01); *B60W 2710/1005* (2013.01)

(56) References Cited

U.S. PATENT DOCUMENTS

| | | | |
|---|---|---|---|
| 2004/0242357 A1* | 12/2004 | Ishizaki | F16H 47/04 475/72 |
| 2007/0235241 A1 | 10/2007 | Udagawa et al. | |
| 2014/0012472 A1 | 1/2014 | Kamada | |
| 2015/0057899 A1* | 2/2015 | Kohmaescher | B60W 10/04 701/58 |
| 2016/0102445 A1* | 4/2016 | Kobiki | B60K 17/10 180/53.4 |

FOREIGN PATENT DOCUMENTS

| | | |
|---|---|---|
| WO | 2014/096446 A1 | 6/2014 |
| WO | 2014/096447 A1 | 6/2014 |
| WO | 2014/096448 A1 | 6/2014 |

* cited by examiner

AGRICULTURAL VEHICLE DRIVELINE

BACKGROUND OF THE INVENTION

Field of Invention

The present invention relates to vehicle drivelines and in particular, but not exclusively, to a driveline for an agricultural vehicle, such as a tractor, and to a method for controlling the same.

Description of Related Art

The purpose of the driveline is to transmit torque from the engine (most usually an internal combustion engine and/or or electric motor) to the wheels (or tracks as may be the case in larger tractors). In addition to the engine and a transmission and one or more clutches for selectively connecting and disconnecting drive to one or more axles of the vehicle, the driveline may also include a flywheel, a transfer box, and front, centre and rear differentials.

In a hydrostatic drive arrangement for a four wheel drive vehicle, the rotational drive from the engine drives a hydraulic pump which in turn provides a pressurised fluid supply driving a pair of hydraulic motors. The hydraulic motors, which have a variable pivot angle to adjust output speed, are connected through respective clutch assemblies to drive the front and rear axles of the vehicle. The hydraulic motors may provide full drive to the respective axles or may supplement a geared mechanical drive from the engine.

In a typical arrangement, a first one of the hydraulic motors may be connected through engagement of a first clutch mechanism to drive a first axle (usually the front axle) alone or connected in parallel with the other hydraulic motor such that both motors drive both front and rear axles when full driving torque is required. This is generally the case for a limited lower range of vehicle speeds, such as when ploughing a field. At higher speeds and lower torque requirements, such as during road work, the first hydraulic motor is disconnected by disengagement of the first clutch mechanism following reduction of the pivot angle of the first hydraulic motor to zero in order to improve efficiency which would otherwise be impaired if the first hydraulic motor were to remain permanently connected. For highest efficiency, the first hydraulic motor should be disconnected as soon as possible.

A problem occurs in such drive systems if the pivot angle of a hydraulic motor is changed from zero with no load on the motor which can then speed up uncontrollably, potentially causing it to damage itself. This can be a particular issue in automated driveline systems where a control system controls the connection and disconnection to load in conjunction with controlling the motor pivot angle.

It is an objective of the present invention to at least mitigate one or more of the above problems.

OVERVIEW OF THE INVENTION

According to a first aspect of the invention there is provided a method for controlling a drivetrain of an agricultural vehicle, which drivetrain comprises first and second driven axles, a variable pivot angle hydraulic motor connectable to drive the first axle by engagement of a first clutch mechanism, and a further motor connected to drive the second axle, the method comprising: decreasing the pivot angle of the variable pivot angle hydraulic motor with variation in a vehicle parameter value to a point at which the pivot angle reaches zero a first parameter value; with the pivot angle at zero and vehicle parameter value continuing to vary due to the drive of the further motor, disengaging the first clutch mechanism at a second vehicle parameter value; wherein the first and second vehicle parameter values are separated by an interval determined at least partly by an operating characteristic of the first clutch mechanism so as to ensure that the first motor becomes loaded before the pivot angle exceeds zero.

Suitably, the operating characteristic of the first clutch mechanism is the time required to engage the clutch from a disengaged state.

Preferably, the variable vehicle parameter value is a transmission ratio of the drivetrain or a driving speed of a vehicle including the drivetrain.

Also in accordance with the present invention there is provided a drivetrain for an agricultural vehicle comprising: first and second driven axles;
a variable pivot angle hydraulic motor connectable to drive the first axle by engagement of a first clutch mechanism;
a further motor connected to drive the second axle;
a controller having an input to receive an indication of a variable vehicle parameter value and being configured to control:
the pivot angle of the variable pivot angle hydraulic motor such that the angle decreases with variation of the vehicle parameter value to a point at which the pivot angle reaches zero at a first parameter value;
engagement and disengagement of the first clutch mechanism including, with the pivot angle at zero and vehicle parameter value continuing to vary due to the drive of the further motor, disengaging the first clutch mechanism at a second vehicle parameter value;
wherein the first and second vehicle parameter values are separated by an interval determined at least partly by an operating characteristic of the first clutch mechanism.

Suitably, the operating characteristic of the first clutch mechanism is the time required to engage the clutch from a disengaged state.

The drivetrain may further comprise a temperature sensor connected with the controller and arranged to determine temperature of an operating fluid in the first clutch mechanism, wherein the controller is further configured to vary the interval in response to variations in determined temperature.

The drivetrain may further comprise user-operable input means coupled with the controller by operation of which a user inputs a transmission aggressiveness setting, wherein the controller is further configured to vary the interval in response to variations in input transmission aggressiveness setting. Alternately, or additionally, by operation of user-operable input means a user may input a braking gradient setting, with the controller further configured to vary the interval in response to variations in input braking gradient setting.

Preferably, the variable vehicle parameter value is a transmission ratio of the drivetrain or a driving speed of a vehicle including the drivetrain.

The present invention further provides an agricultural vehicle including a drivetrain as above, which may suitably further comprise one or more sensors coupled with the controller by reference to which the controller is configured to determine when the vehicle is coasting and, if so, to extend the interval by a predetermined amount. Alternately, on determination of coasting, the controller may be configured to prevent disengagement of the first clutch mechanism at the second speed value.

In such an agricultural vehicle, the first driven axle is suitably the front axle and the second driven axle is the rear axle.

The invention will now be described, by way of example only, and with reference to the following drawings, in which:

DETAILED DESCRIPTION OF THE INVENTION

Figure 1:
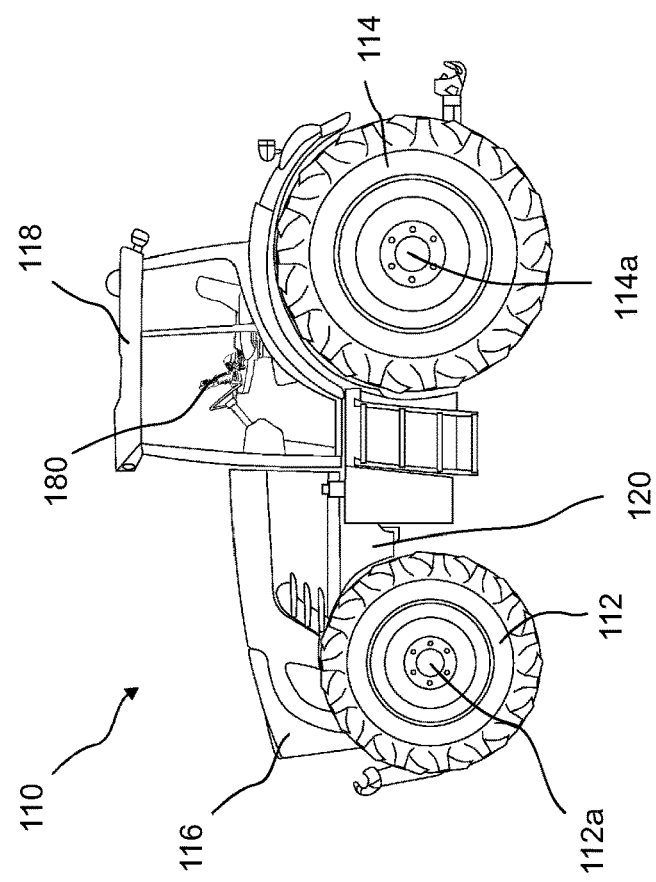
FIG. 1 is a representation of a standard tractor including a driveline according to the present invention.

FIG. 1 shows an agricultural vehicle, in the form of a tractor 110, having front wheels 112 on respective axles 112a, rear wheels 114 on respective axles 114a, an engine cover 116 and operator cab 118. The tractor 110 has a chassis (not shown in FIG. 1 for clarity) provides support for the tractor and a driveline 120 which provides propulsive drive. In some tractors the driveline may form part of the chassis, for example where the outer casing of a transmission and a rear transaxle is structurally integral to the chassis.

Figure 2:
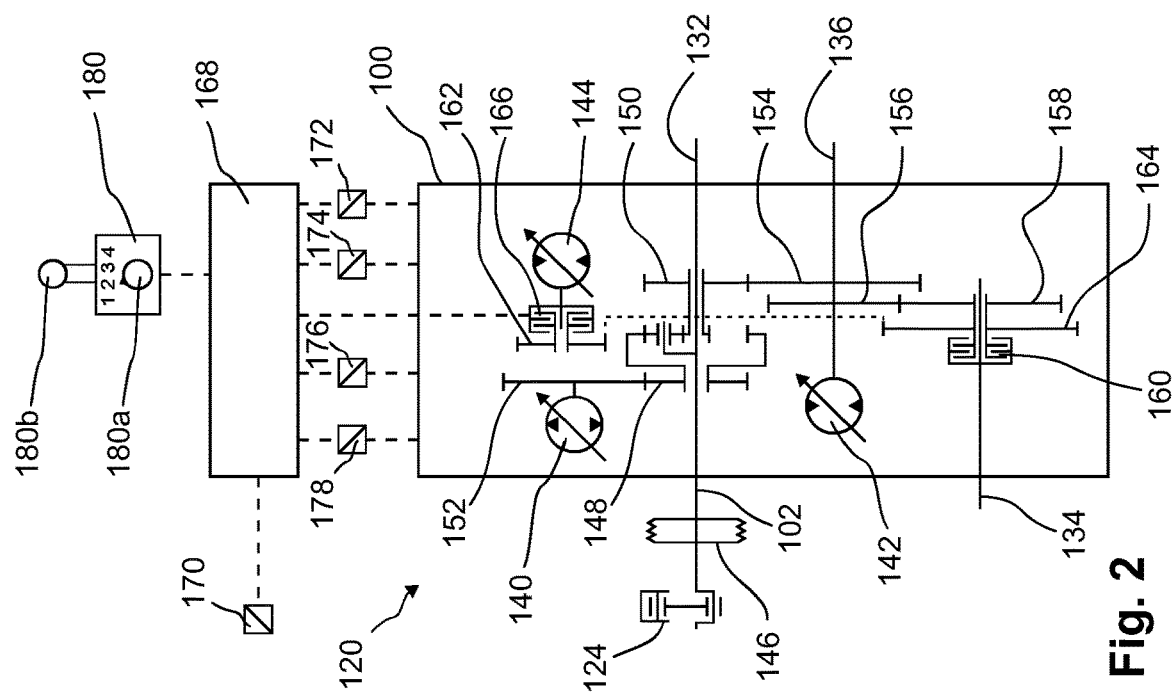
FIG. 2 is a schematic representation of the driveline of the tractor of FIG. 1.

FIG. 2 shows the driveline 120 having a prime mover in the form of an internal combustion engine 124 and a first configuration of transmission (indicated schematically in the Figure by line 100). The transmission 100 has an inner transmission casing (not shown in FIG. 2) which is mounted inside an outer structural housing (not shown) which forms part of the chassis. Accordingly, the transmission 100, specifically the inner casing, supports or houses all of the components required to provide the full transmission output power with variable torque, variable vehicle speed and variable driving direction over a full range of vehicle speeds. Further details of such an inner casing arrangement may be found in the commonly-assigned International patent application WO2014/096448.

It will be appreciated that whilst the example of prime mover given is that of an internal combustion engine, it is conceivable within the scope of the invention that the prime mover could be an electric motor or other form of propulsive engine.

The configuration of the tractor 110 shown in FIGS. 1 and 2 is a four wheel drive tractor with steered front wheels.

The engine 124 provides drive to the transmission 100 via a flywheel 146. The transmission 100 drives front and rear axle drive shafts 134,136 to provide propulsive drive to the wheels 112, 114. In addition to providing propulsive drive, the transmission 100 also provides drive to a rear power take-off drive shaft 132.

The engine 124 is connected to an input shaft 102 of the transmission 100 via the flywheel 146. The input shaft 102 is connected at its inboard end to a planetary gear assembly indicated generally at 148. The purpose of the planetary gear assembly 148 is to split the torque provided by the input shaft 102 between a mechanical branch indicated generally at 150 and a hydrostatic branch indicated generally at 152. On the opposite side of the planetary gear assembly to the input shaft 102 is the rear power take off shaft 132.

The hydrostatic branch 152 drives a hydraulic pump 140. The mechanical branch 150 is connected to the front axle drive shaft 134 and rear axle drive shaft 136 as follows. Torque is transmitted from the mechanical branch 150 of the planetary gear assembly 148 to the rear axle drive shaft 136 via a rear axle gear 154. Mounted on the same shaft as the rear axle drive gear 154 is an intermediary gear 156 which in turn drives a front axle drive gear 158 which selectively drives the front axle drive shaft 134. A clutch 160 is provided to selectively engage and disengage the front axle drive shaft 134 from the rear axle drive shaft 136 or to control the ratio of torque distribution between the two axles. This allows grip to be optimised dependant on the ground conditions.

In addition to the mechanical drive path described above, the hydraulic pump 140 is hydraulically connected (not shown in FIG. 2 for clarity) to a first hydraulic motor 142 which is driveably connected to the rear axle drive shaft 136 in order to provide hydraulic drive to the rear wheels. The hydraulic pump 140 is also connected to a second hydraulic motor 144 in order to provide hydraulic drive to the front axle drive shaft 134 as follows. The motor 144 is driveably connected to the front axle drive shaft 134 via first and second hydraulic motor gears 162, 164. A clutch 166 allows the second hydraulic motor 144 to be selectively engaged and disengaged from the front axle drive shaft 134. This allows hydraulic drive to be provided to the front axle drive shaft 134 by the second hydraulic motor 144 in addition to, or alternatively to, the drive delivered to the front axle drive shaft 134 from the rear axle drive shaft 136 via the intermediary and front axle drive gears 156, 158, depending on the extent of engagement of the clutch 160.

Second hydraulic motor 144 is connected to front axle drive shaft 134 by gears 162, 164 having a high gear ratio. This allows motor 144 to provide high torque at a limited, lower range of vehicle speeds. Consequently, at higher vehicle speeds, the motor 144 may be disconnected from driveline 120 via clutch 166. Due to the layout, the first hydraulic motor 142 is provided for delivering lower torque but over the full range of vehicle speeds. However, in combination, both motors 142, 144 enable the transmission to provide a full transmission output power with variable torque, variable vehicle speed and variable driving direction over a full range of vehicle speeds.

For illustrative purposes, the adjustment of the transmission ratio will now be briefly described. Further details are given in applicant's published application WO2014/096446, the disclosure of which is incorporated herein by reference.

The hydraulic pump and motor are typically of a bent-axis design, as is well known in the art, although could be of a swashplate design. For the avoidance of doubt the term variable displacement pump/motor is taken to include swashplate or bent-axis pump/motors and any other form of hydraulic pump/motor providing variable displacement in order to vary the relationship between mechanical speed/torque and fluid pressure/flow rate or to adjust transmission ratio. The operating angle or pivot angle of the motor/pump is typically controlled by a piston which moves under hydraulic pressure to rotate the bent-axis. Flow of hydraulic fluid into the piston is controlled by a pilot valve which is itself operated by an actuator in order to initiate the change in operating angle or pivot angle and thereby the transmission ratio. The pilot valve is actuated by followers and a rotating cam on an actuator shaft. The actuator shaft is driven by an electric actuator which is controlled by controller 168. Furthermore, the adjustment of the pivot angle may be provided through other means known in the art, e.g. by using electrically controlled pilot valves.

In a described embodiment of WO2014/096446, for each transmission ratio the pivot angle of the pump 140 and motor 142, 144 is stored in a characteristic map. Depending on the transmission input speed coming from the combustion engine 124, the vehicle speed may vary even if the transmission ratio is the same.

The same effect may occur with tyre slipping or when the tyre pressure is massively changed so that the effective tyre diameter changes. Furthermore a subsequent split transmission may have the same effect. For an operating condition in which the transmission input speed does not vary, the transmission ratio and the vehicle speed are proportional with the transmission ratio decreasing with the vehicle speeding up.

Alternatively, the pivot angle may be stored depending on demanded vehicle speed or even depending on the rotational speed of the wheels.

By way of further explanation, various drive configurations in the drivetrain of FIG. 2 are possible depending on the operating positions of clutches 160 and 166:

With the clutch 160 disengaged, and the clutch 166 engaged, motor 142 drives the rear axle drive shaft 136 and thereby rear axle 114a, and motor 144 drives the front axle drive shaft 134 and thereby front axle 112a.

With the clutch 160 disengaged, and the clutch 166 disengaged, motor 142 drives the rear axle drive shaft 136 and thereby rear axle 114a. The front axle drive shaft 134 and thereby front axle 112a is not driven.

With the clutch 160 engaged, and the clutch 166 disengaged, motor 142 drives the rear axle drive shaft 136 and thereby rear axle 114a. The motor 142 also drives the front axle drive shaft 134 and thereby front axle 112a.

With the clutch 160 engaged, and the clutch 166 engaged, motor 142 and motor 144 both drive the rear axle drive shaft 136 and thereby rear axle 114a. The motors 142, 144 also drive the front axle drive shaft 134 and thereby front axle 112a.

With the clutch 160 variably controlled, torque supplied by motor 142 to the front axle drive shaft 134, and thereby front axle 112, can be adapted.

As mentioned above, at higher vehicle speeds or lower transmission ratio respectively, the motor 144 may be disconnected from driveline 120 by disengagement of clutch 166. A method for control of the disengagement to prevent overrunning of the motor 144 is effected by the controller 168 coupled with the driveline 120. The controller 168 has various inputs to receive sensor signals or general data, e.g. input 170 to receive an indication of vehicle speed Depending on different factors or parameters, the disengagement of clutch 166 must be prevented or delayed by a delay interval.

One factor that should be accounted for in the controller 168 in controlling disengagement of clutch 166 is whether the vehicle is coasting. If there is no load on motor 144 (clutch 166 disengaged), the motor can be driven to reverse rotation if the vehicle is coasting. So whenever coasting is detected, a fixed delay interval is applied. During coasting during downhill driving and when clutch 166 is disengaged, gear 162 would rotate in a first direction because they are driven by front wheels 112. As the hydraulic circuit is fluidly connecting motors 142,144, both motors are intended to be driven in the opposite, second direction. As motor 142 is driven by rear wheels 114 in the first direction, the motor 142 cannot change its rotational direction. Opposite to that, motor 144 is not prevented to change the rotational direction to the second direction as the motor can freely rotate without supporting the torque. As a consequence, if now the clutch 166 would be engaged, gear 162 rotating in first direction would immediately reverse the rotational direction of motor 144 from the second direction to the first direction. Considering that the speeds of motor 144 may be up to 4000 rpm, motor may undergo a change from −4000 rpm to +4000 rpm resulting in damage.

The presence of coasting may be determined by a pair of pressure sensors 172, 174 measuring fluid pressure in the transmission and a further sensor 176 for the speed of motor 144. Further details of such an arrangement are described in the applicants European patent application 15177259.7. Alternatively, when the degree of coast can be determined (which is not the case in the shown embodiment), the delay interval may adapted to the degree of coasting, where the degree or extent of coasting (as a percentage or ratio) is the amount of force due to gravity, inertia etc. acting to move the vehicle against the amount of force moving the vehicle due to the engine drive.

A key feature in the control of the disengagement of clutch 166 is the time required to re-engage it, as will be described further below. In addition to mechanical considerations such as the design of the clutch, the flow resistance in supply lines and so forth, variations in the temperature of the operating fluid in the clutch will affect re-engagement timings and the controller 168 is provided with a temperature sensor 178 for the clutch fluid. The term operating fluid means that the fluid is on the one hand providing cooling for the components in the clutch 166 but on the other hand also operates the pistons which opens and closes the clutch. So whenever the operating fluid temperature is low, the delay interval must be increased as the higher flow resistance of the fluid in the supply lines will result in extended engagement timing.

The transmission acceleration (also known as transmission aggressiveness) will also affect re-engagement timings. Where this feature is adjustable by the machine operator from cab 118, by means of a setting control 180, the current setting is also suitably taken into account by the controller 168. Setting control 180 may thereby consist of a pre-selector 180a to adjust transmission acceleration stepwise (e.g. 4 steps such as shown in FIG. 2) or be continuously variable. Furthermore drive lever 180b is provided to adjust the driving direction. If the drive lever 180b is pushed in a first direction (e.g. to left side in FIG. 2), the vehicle drives forward or accelerates while moving the drive lever 180b in the opposite direction results in reverse driving or deceleration. Setting control 180 may contain alternative elements such as foot pedals to adjust driving direction and transmission acceleration. More alternatively, the transmission acceleration may be determined automatically by considering the operators behaviour (e.g. if the drive lever 180b is pushed fast or slow). When the transmission aggressiveness/acceleration is high, e.g. when the pre-selector 180a is adjusted to position indicated with "4" in FIG. 2, the vehicle speed is reduced much faster than with a lower degree of transmission aggressiveness/acceleration, e.g. when the pre-selector 180a is adjusted to position indicated with "1". As a consequence a higher transmission aggressiveness/acceleration requires the delay interval to be increased.

A further parameter influencing the re-engagement timings is the braking gradient depending on how fast the vehicle decelerated by braking. A high braking gradient would thereby mean that the vehicle is decelerated fast while a low braking gradient would mean a slow deceleration. Problems arise as the braking gradient is in the first place dependent on how the driver jams on the brake. As this is highly situational, the braking gradient cannot be surely determined in advance. So in the shown embodiment, a maximum gradient is taken (which means that the vehicle is braked very fast under optimum conditions) so that a constant delay interval is sufficiently high. Alternatively, the braking gradient may be determined completely or partly in advance depending on the following parameters:

the pressure in the air brake system providing service brake and/or park brake is a measure for the braking capability. The lower the pressure is the more time is needed to activate the brakes. So the delay interval may be enlarged.

furthermore if the vehicle drives with a trailer attached, the weight to be braked increases. So the delay interval may be enlarged.

Any other known factors may be used to predictively determine the braking gradient and thereby provide a more suitable delay interval, whereby a safety margin to consider drivers braking behaviour may still be appropriate.

Especially for a vehicle with continuously variable transmission, the transmission acceleration and the braking gradient are very similar as the vehicle may be decelerated by applying the service brake or moving drive lever 180b into the second direction assigned to deceleration (as shown in FIG. 2).

In practice the factors mentioned above are not considered in isolation. The delay interval applied may result from different portions. A first constant portion may result from the braking gradient plus a second and third variable portion resulting from operating fluid temperature and transmission acceleration. Optionally when coasting occurs, a fourth portion may consider coasting.

The method for control of the motor 144 and disengagement of clutch 166 by controller 168 will now be described with reference to the flowchart of FIG. 3 and the plot of FIG. 4a and FIG. 4b which shows variation in transmission ratio i for the driveline, and pivot angle β and rotational speed n of motor 144 with increasing speed v of the vehicle. As already mentioned above, the vehicle speed v may vary even if the transmission ratio i is constant, e.g. when the engine speed is changed. But for the described embodiment, a proportional relationship between vehicle speed v and transmission ratio i is considered. So both the transmission ratio i and the vehicle speed v may represent a vehicle parameter value configured to control the pivot angle β and engagement and disengagement of clutch 166.

Initially, at step 200 and with clutch 166 engaged, the rotational speed n of motor 144 is increasing with increase of vehicle speed v (corresponding a decrease of transmission ratio i): at the same time, the pivot angle β of the motor 144 is being reduced. At a given point, determined at step 202 and indicated in FIG. 4a at vehicle speed v1 (corresponding transmission ratio i1), the pivot angle β reaches zero. In the range where β>0, indicated by arrow 190, the motor 144 must remain loaded (through the engagement of clutch 166) to prevent uncontrolled acceleration of the motor 144.

In the range of increasing vehicle speed v (corresponding a decreasing transmission ratio i), where β=0, indicated by arrow 192, the clutch 166 may be disengaged to prevent the rotational speed n of the motor 144 becoming too high as the vehicle is propelled by the engine 124 and motor 142. However, as there is a finite time required to engage the clutch 166, the method of the invention defers the point of disengagement (i2) beyond i1 by an interval determined at least partly by an operating characteristic, suitably time to engage, of the clutch 166. This ensures that the motor 144 can always be loaded (which requires engagement of clutch 166) before the vehicle speed drops below v1 (corresponding an increase above transmission ratio i1) and motor pivot angle β moves above zero. The interval I is indicated in FIG. 4a by arrow 194a (separation of i1 and i2) and also by arrow 194a' (separation of v1 and v2).

Figure 3:
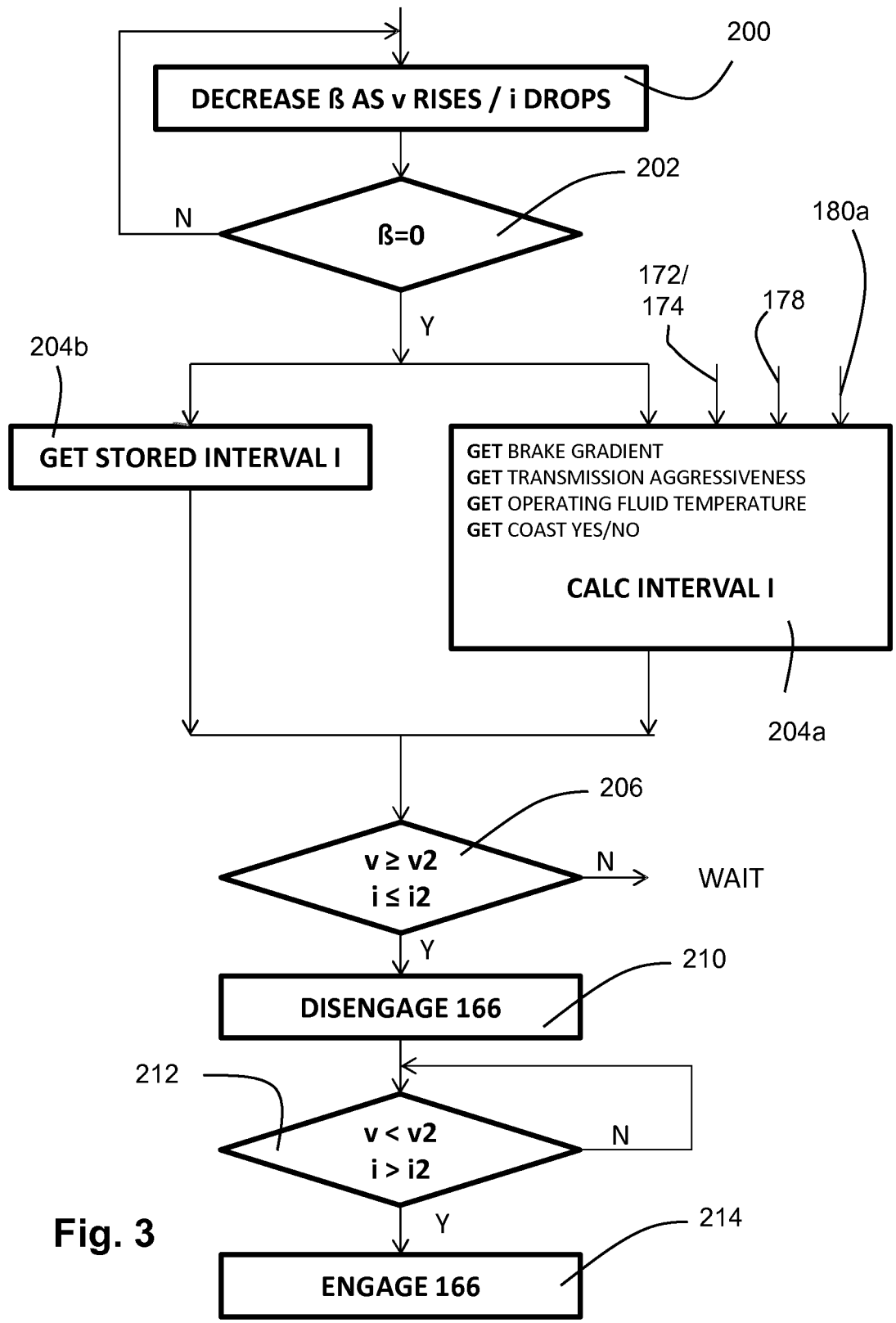
FIG. 3 is flowchart representation of a method for controlling a driveline according to the present invention.
Figure 4A:
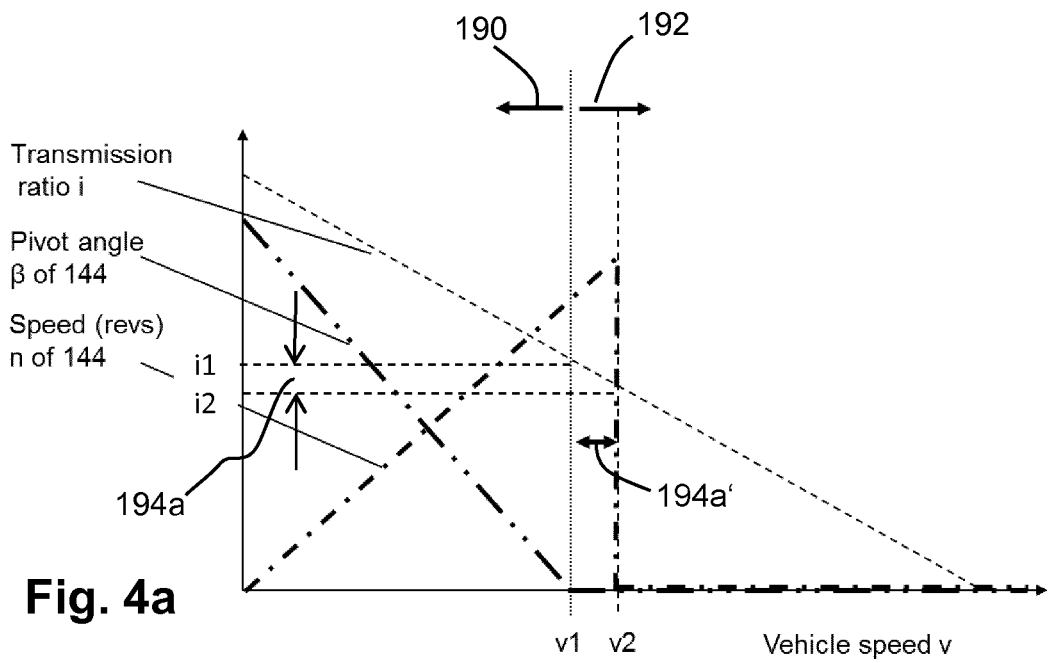
FIGS. 4a and 4b illustrate speed and pivot angle of a hydraulic motor and transmission ratio variation with vehicle speed in the driveline of FIG. 2.
Figure 4B:
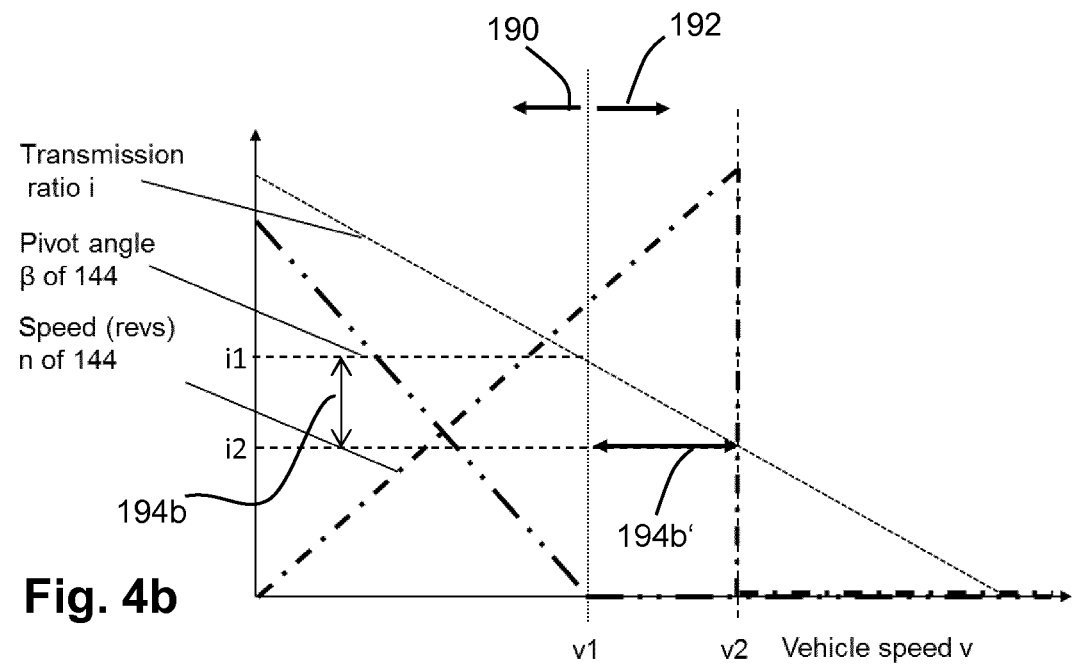

Reverting to FIG. 3, two alternative options are shown as steps 204a and 204b. In step 204a, the disengagement delay interval I is calculated by reference to known operating characteristics of the clutch 166 together with actively monitored factors such as clutch coolant temperature (from sensor 178) and transmission acceleration setting (from control 180). Frequent or continuous recalculation based on such factors enables the interval I to be minimised, with clutch 166 disengaged as soon as possible after v1 is exceeded or i1 is undercut. Such recalculation has cost implication in terms of the processing capability and also the necessary provision of monitored sensors so an alternative approach (step 204b) simply uses a stored default value for the interval. Of necessity, the stored default interval will assume worse-case values for all contributing factors in its derivation and thus be greater than the actively recalculated value in most circumstances. Alternative step 204b may also be applied when the contributing factors may not be determined properly, e.g. in case of a failure of sensors 178, 172, 174. FIG. 4b is substantially identical to FIG. 4a but illustrates the longer interval when a stored value is used: interval I is indicated in FIG. 4b by arrow 194b (separation of i1 and i2) and also by arrow 194b' (separation of v1 and v2).

When the interval has elapsed (v=v2 or i=i2; step 206) the clutch 166 is disengaged at step 210. A further check at step 212 watches for the vehicle speed to drop below v2 (corresponding an increase above transmission ratio i2) which triggers the re-engagement of the clutch at step 214.

In the foregoing the applicants have described a drivetrain for an agricultural vehicle and method for controlling the same. The drivetrain comprises first and second driven axles with a variable pivot angle hydraulic motor 144 connectable to drive the first axle through engagement of a first clutch mechanism 166. A further motor 142 is connected to drive the second axle. In operation, the pivot angle β of the variable pivot angle hydraulic motor 144 is reduced with variation in a vehicle parameter value, such as transmission ratio or ground speed, to a point at which the pivot angle reaches zero at a first parameter value. With the pivot angle β at zero and parameter value continuing to vary due to the drive of the further motor 142, the first clutch mechanism 166 is disengaged at a second parameter value, with the first and second parameter values separated by an interval I determined at least partly by an operating characteristic of the first clutch mechanism 166.

Applying this interval I during disengagement ensures that under each operating condition, the re-engagement of clutch can be achieved prior to reduction to speed v1/increase to transmission ratio i1 so that the motor 144 can always be loaded (which requires engagement of clutch 166) before the vehicle speed drops below v1 or the transmission ratio exceeds i1 and motor pivot angle β moves above zero.

From reading of the present disclosure, other modifications will be apparent to those skilled in the art. Such modifications may involve other features which are already known in the field of vehicle differentials and component parts therefore and which may be used instead of or in addition to features described herein.

The invention claimed is:

1. A drivetrain for an agricultural vehicle comprising:
   first and second driven axles;
   a variable pivot angle hydraulic motor connectable to drive the first axle by engagement of a first clutch mechanism;
   a further motor connected to drive the second axle;
   a controller having an input to receive an indication of a variable vehicle parameter value and being configured to control:
      the pivot angle of the variable pivot angle hydraulic motor such that the angle decreases with variation of the vehicle parameter value to a point at which the pivot angle reaches zero at a first parameter value;
      engagement and disengagement of the first clutch mechanism including, with the pivot angle at zero and vehicle parameter value continuing to vary due to the drive of the further motor, disengaging the first clutch mechanism at a second vehicle parameter value;
      wherein the first and second vehicle parameter values are separated by an interval determined at least partly by an operating characteristic of the first clutch mechanism.

2. A drivetrain for an agricultural vehicle comprising:
   first and second driven axles;
   a variable pivot angle hydraulic motor connectable to drive the first axle by engagement of a first clutch mechanism;
   a further motor connected to drive the second axle;
   a temperature sensor connected with a controller and arranged to determine temperature of an operating fluid in the first clutch mechanism;
   the controller having an input to receive an indication of a variable vehicle parameter value and being configured to control:
   the pivot angle of the variable pivot angle hydraulic motor such that the angle decreases with variation of the vehicle parameter value to a point at which the pivot angle reaches zero at a first parameter value;
   engagement and disengagement of the first clutch mechanism including, with the pivot angle at zero and vehicle parameter value continuing to vary due to the drive of the further motor, disengaging the first clutch mechanism at a second vehicle parameter value;
   wherein the first and second vehicle parameter values are separated by an interval determined at least partly by an operating characteristic of the first clutch mechanism, wherein the controller is further configured to vary the interval in response to variations in determined temperature.

3. The drivetrain for an agricultural vehicle as claimed in claim 1, further comprising user-operable input means coupled with the controller by operation of which a user inputs a transmission aggressiveness setting, wherein the controller is further configured to vary the interval in response to variations in input transmission aggressiveness setting.

4. The drivetrain for an agricultural vehicle as claimed in claim 1, further comprising user-operable input device coupled with the controller by operation of which a user inputs a braking gradient setting, wherein the controller is further configured to vary the interval in response to variations in input braking gradient setting.

5. The drivetrain for an agricultural vehicle as claimed in claim 1, wherein the variable vehicle parameter value is a transmission ratio of the drivetrain.

6. The drivetrain for an agricultural vehicle as claimed in claim 1, wherein the variable vehicle parameter value is a driving speed of a vehicle including the drivetrain.

7. An agricultural vehicle including a drivetrain comprising:
   first and second driven axles;
   a variable pivot angle hydraulic motor connectable to drive the first axle by engagement of a first clutch mechanism;
   a further motor connected to drive the second axle;
   a controller having an input to receive an indication of a variable vehicle parameter value and being configured to control:
      the pivot angle of the variable pivot angle hydraulic motor such that the angle decreases with variation of the vehicle parameter value to a point at which the pivot angle reaches zero at a first parameter value;
      engagement and disengagement of the first clutch mechanism including, with the pivot angle at zero and vehicle parameter value continuing to vary due to the drive of the further motor, disengaging the first clutch mechanism at a second vehicle parameter value;
      wherein the first and second vehicle parameter values are separated by an interval determined at least partly by an operating characteristic of the first clutch mechanism.

8. The agricultural vehicle as claimed in claim 7, further comprising one or more sensors coupled with the controller by reference to which the controller is configured to determine when the vehicle is coasting and, if so, to extend the interval by a predetermined amount.

9. The agricultural vehicle as claimed in claim 7, further comprising one or more sensors coupled with the controller by reference to which the controller is configured to determine when the vehicle is coasting and, if so, to prevent disengagement of the first clutch mechanism at the second vehicle parameter value.

10. The agricultural vehicle as claimed in 7, wherein the first driven axle is the front axle and the second driven axle is the rear axle.

11. A method for controlling a drivetrain of an agricultural vehicle, which drivetrain comprises first and second driven axles, a variable pivot angle hydraulic motor connectable to drive the first axle by engagement of a first clutch mechanism, and a further motor connected to drive the second axle, the method comprising:
   decreasing the pivot angle of the variable pivot angle hydraulic motor with variation in a vehicle parameter value to a point at which the pivot angle reaches zero at a first vehicle parameter value;
   with the pivot angle at zero and vehicle parameter value continuing to vary due to the drive of the further motor, disengaging the first clutch mechanism at a second vehicle parameter value;
   wherein the first and second vehicle parameter values are separated by an interval determined at least partly by an operating characteristic of the first clutch mechanism, wherein the operating characteristic of the first clutch mechanism is the time required to engage the clutch from a disengaged state.

12. The method for controlling a drivetrain for an agricultural vehicle as claimed in claim 11, wherein the variable vehicle parameter value is a transmission ratio of the drivetrain.

13. The method for controlling a drivetrain for an agricultural vehicle as claimed in claim 11, wherein the variable vehicle parameter value is a driving speed of a vehicle including the drivetrain.

* * * * *